United States Patent
Lagasse (10) Patent No.: US 7,102,121 B2
(45) Date of Patent: Sep. 5, 2006

(54) TEMPERATURE COMPENSATION FOR QKD SYSTEMS

(75) Inventor: Michael Lagasse, Nahant, MA (US)

(73) Assignee: MagiQ Technologies, Inc., New York, NY (US)

( * ) Notice: Subject to any disclaimer, the term of this patent is extended or adjusted under 35 U.S.C. 154(b) by 99 days.

(21) Appl. No.: 10/882,013

(22) Filed: Jun. 29, 2004

(65) Prior Publication Data

US 2006/0016972 A1    Jan. 26, 2006

(51) Int. Cl.
G01J 1/04  (2006.01)

(52) U.S. Cl. ................... 250/227.14; 250/238

(58) Field of Classification Search ........... 250/227.14, 250/238

See application file for complete search history.

(56) References Cited

U.S. PATENT DOCUMENTS

| | | | |
|---|---|---|---|
| 4,712,078 A | 12/1987 | Slobotnik et al. | |
| 5,266,792 A | 11/1993 | Crowne et al. | |
| 5,644,271 A | 7/1997 | Mollov et al. | |
| 5,844,928 A | 12/1998 | Shastri et al. | |
| 5,903,523 A | 5/1999 | Peck | |
| 5,912,595 A | 6/1999 | Ma et al. | |
| 5,936,603 A | 8/1999 | Lippmann et al. | |
| 5,982,833 A | 11/1999 | Waters | |
| 6,445,238 B1 | 9/2002 | Lesea | |
| 6,678,379 B1 * | 1/2004 | Mayers et al. | 380/278 |
| 2003/0169880 A1 | 9/2003 | Nambu et al. | |

OTHER PUBLICATIONS

[Maxim Products], "Reference design HPRD-02.0" Published on Apr. 29, 2002 by Maxim Integrated Products.
Nash, "Using the AD771x Family of 24-bit Sigma-Delta a/d Converters," Published by Analog Devices, Norwood, MA Jun. 1996.

* cited by examiner

Primary Examiner—Que T. Le
(74) Attorney, Agent, or Firm—Opticus IP Law, PLLC (57) ABSTRACT

Systems and methods for compensating a QKD system for variations in temperature are disclosed. One of the methods includes identifying an optimum detector gating signal timing as a function of temperature for a single-photon detector (SPD) control board in one of the QKD stations. The detector gating signal timing versus temperature information is stored in a look-up table in a memory unit. The QKD system's temperature is monitored during operation and the timing of the detector gating signal is adjusted based on the operating temperature and the corresponding timing value adjustment in the look-up table. The result is a compensated detector gating timing signal provided to the SPD that yields an optimum number of photon counts even as the temperature of the QKD station varies.

9 Claims, 7 Drawing Sheets

TEMPERATURE COMPENSATION FOR QKD SYSTEMS

FIELD OF THE INVENTION

The present invention relates to quantum cryptography, and in particular relates to systems and methods for temperature compensation for a quantum key distribution (QKD) system.

BACKGROUND OF THE INVENTION

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175–179 (IEEE, New York, 1984). Specific QKD systems are described in U.S. Pat. No. 5,307,410 to Bennett, and in the publication by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27–33.

The above-mentioned references describe a so-called "one-way" QKD system wherein Alice randomly encodes the polarization or phase of single photons, and Bob randomly measures the polarization or phase of the photons. The one-way system described in the Bennett 1992 paper and incorporated by reference herein is based on a shared interferometric system. Respective parts of the interferometric system are accessible by Alice and Bob so that each can control the phase of the interferometer. The signals (pulses) sent from Alice to Bob are time-multiplexed and follow different paths. As a consequence, the interferometers need to be actively stabilized to within a few tens of nanoseconds during transmission to compensate for thermal drifts.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is less susceptible to environmental effects than a one-way system.

When operating a QKD system in practice (e.g., in a commercial setting), multiple variables need to be aligned in time and then maintained aligned for optimal system performance. For example, in a commercial QKD system one or more single-photon detectors (SPDs) are gated with one or more corresponding detector gating signals from a controller to synchronize the detection of optical pulses with expected pulse arrival times. However, once the system is set up, the timing drifts due to various systemic and environmental factors (e.g., temperature) and the photon count can drop. This leads to a reduction in the transmission rate of the system, and also to an increase in the bit—error rate—i.e., to diminished system performance.

Laboratory and prototype QKD systems can be adjusted to account for system drifts can under very controlled and artificial conditions. However, making the same kinds of adjustments for a commercial QKD system in the field is a far more daunting endeavor. And, unlike with a laboratory or prototype QKD system, end-users of commercial QKD systems have an expectation that their QKD system will automatically run in an optimal state with minimal or no operator intervention.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

SUMMARY OF THE INVENTION

A first aspect of the invention is a method of providing temperature compensation for the timing of a gating signal for a single-photon detector (SPD) in a QKD station of a QKD system. The method includes determining a reference detector gating signal timing value corresponding to an ambient reference temperature of the QKD station, e.g., at or near an SPD electronics control board. The method also includes incrementally varying and measuring a temperature of the QKD station over a range of temperature values, and determining a change in timing from the reference detector gating signal timing value for each measured temperature value. The method further includes storing the measured temperature value and the corresponding change in timing of the detector gating signal in a look-up table, operating the QKD station at an operating temperature that varies over time within the range of temperature values, and then adjusting the timing of an operational detector gating signal by an amount associated with the operating temperature as defined in the look-up table.

A second aspect of the invention is a method of providing temperature compensation for the timing of a gating signal for a single-photon detector (SPD) in a QKD station of a QKD system. The method includes incrementally varying and measuring the temperature of the QKD station over a range of temperature values, determining an optimum detector gating signal timing value for each measured temperature value, and storing the measured temperature value and the corresponding optimal detector gating signal timing value in a look-up table. The method further includes operating the QKD station at an operating temperature that varies over time within the range of temperature values, and adjusting the timing of the detector gating signal to correspond to that associated with the corresponding operating temperature based on the temperature and timing values stored in the look-up table.

In general, the relationship between the timing drift and the temperature may be a simple equation. In this case, a lookup table is not required. For example, it might be determined that the relation ship is linear, such as 100 ps of timing drift per degree C. In such a case, the method includes adjusting the operating temperature based on the simple equation.

A third aspect of the invention is a method relating to the above-described aspects, and further including providing an uncompensated detector gating signal from a timing/synchronization unit that controls the timing and synchronization of the QKD system to a summation unit, providing the look-up table timing value to the summation unit in response to a temperature signal representative of the operating temperature, forming in the summation unit a compensated detector gating signal, and then providing the compensated detector gating signal to the SPD.

DETAILED DESCRIPTION OF THE INVENTION

The present invention relates to systems and methods of thermally compensating one or more timing signals gating one or more SPDs in a QKD system in order to maintain optimal system performance. In particular, the present invention involves compensating for errors in detector gating due to thermal drifts to maintain the optimal detector gating signal position (timing) during the QKD system's operation. This results in optimal optical pulse detection in the QKD system, which generally corresponds to the optimal operation of the QKD system as a whole. In the discussion below, the various signals S1, S2, S3, etc., can be considered digital voltage signals.

The invention is applicable to one-way, two-way, free-space and ring topology, n-way QKD systems, etc., using either polarization encoding or phase encoding, and using one or more SPDs. The invention is first described below in connection with an example embodiment of a two-way QKD system using phase-encoding and a single SPD located in one of the QKD stations (Bob). The invention is also described in connection with a one-way phase-encoding system having two SPDs. These choices are merely for the sake of illustration and are not intended as limiting the invention to these types of QKD systems.

Also, in the description below, a "gating signal" is a signal that activates the element to which the signal is sent, wherein the activation of the element corresponds to the duration (width W) of the signal. Thus, the detector gating signal activates the SPD for the duration (i.e., width) of the detector gating signal, wherein activation starts at the leading edge of the signal and ends at the trailing edge of the signal.

Two-Way QKD System Embodiment

Figure 1:
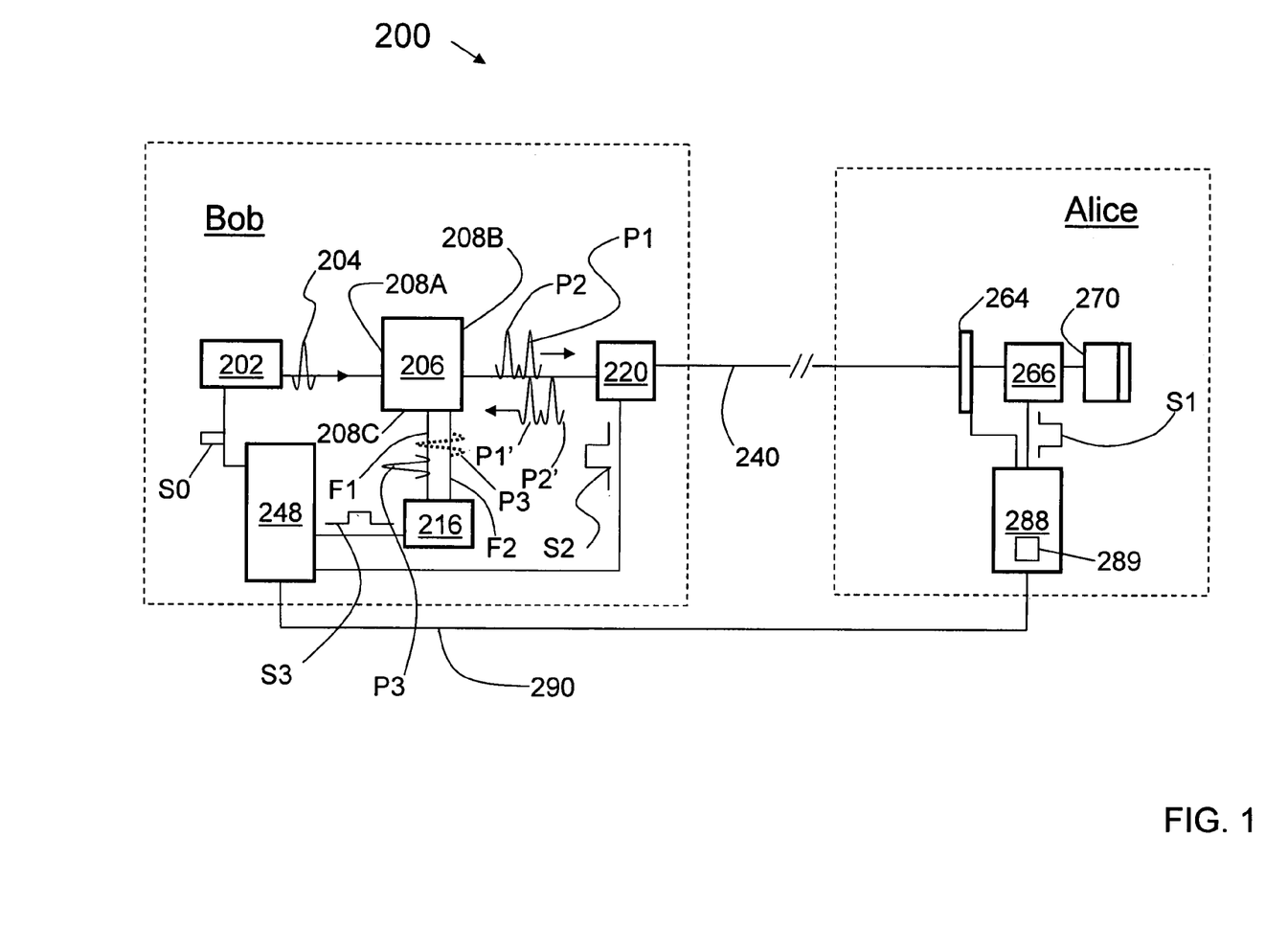
FIG. 1 is a schematic diagram of a two-way QKD system.

FIG. 1 is a schematic diagram of an example embodiment of a two-way QKD system 200 to which the methods of the present invention are aptly suited. System 200 includes two key encoding stations: a transmitting/receiving station Bob and a reflecting station Alice, referred to hereinafter simply as "Bob" and "Alice."

Bob

With continuing reference to FIG. 1, Bob includes a laser 202 that emits initial light pulses 204. Laser 202 is coupled to a time-multiplexing/demultiplexing optical system 206 having an input end 208A, an input/output end 208B, and a detector output end 208C. Optical system 206 receives input pulses 204 at input end 208A, splits each pulse into two time-multiplexed pulses P1 and P2 and outputs them at input/output end 208B. Likewise, optical system 206 also receives optical pulses at input/output end 208B, as described below.

Figure 2A:
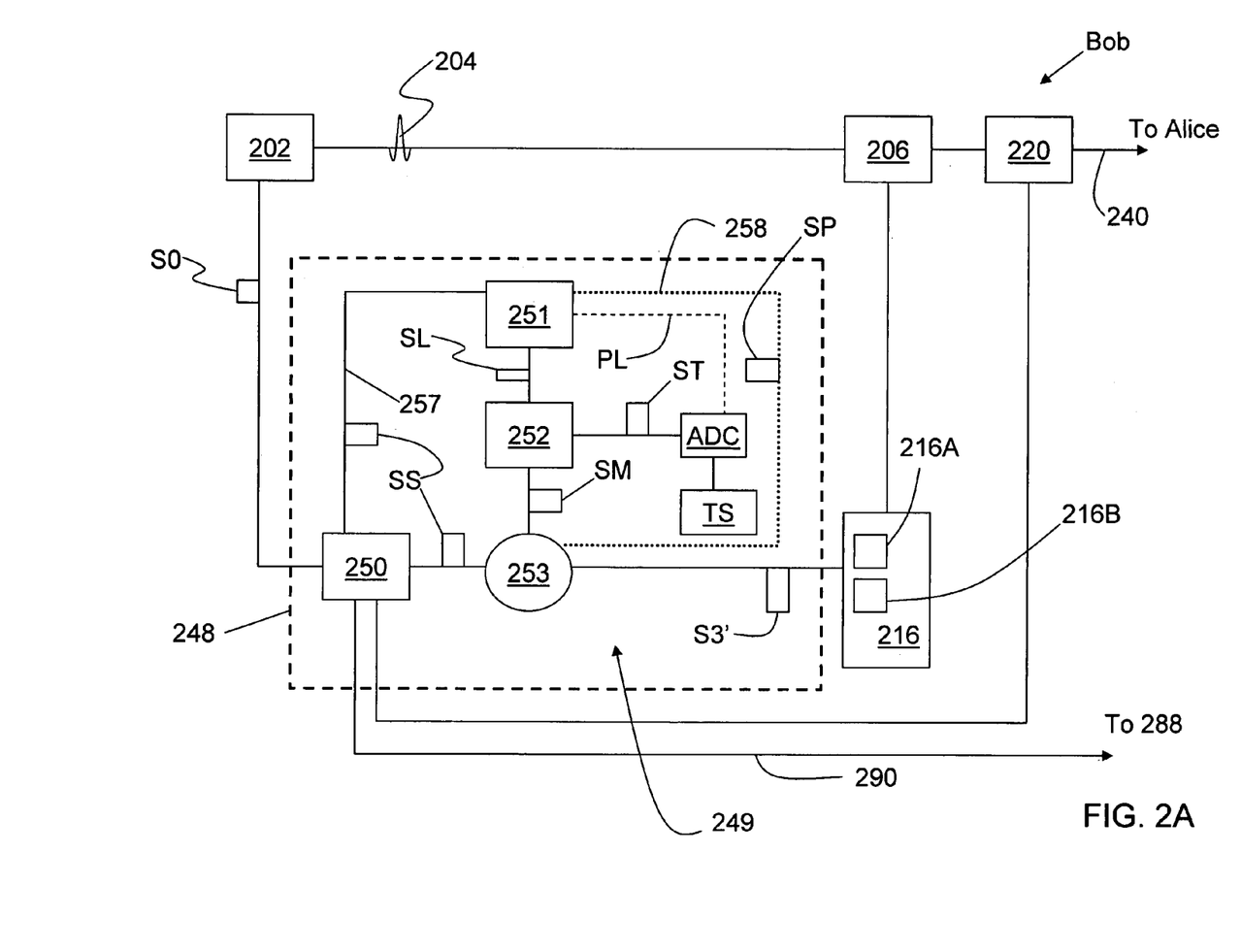
FIG. 2A is a close-up schematic diagram of the controller for the QKD system of FIG. 1, illustrating the elements that provide thermal compensation of the detector gating signal for the SPD.

A single-photon detector (SPD) unit 216 having one or more SPDs is coupled to optical system 206 at detector output end 208C. In the present example, SPD unit has two SPDs 216A and 216B coupled to output end 208C via respective optical fiber links F1 and F2 (FIG. 2). A phase modulator (PM) 220 is coupled (e.g., by an optical fiber) to optical system input/output end 208B. An optical fiber 240 connects Bob to Alice at PM 220.

Bob also includes a controller 248 operatively (e.g., electrically) coupled to laser 202, SPD unit 216, and PM 220 to control the operation of these elements, as described below.

FIG. 2A includes a more detailed view of controller 248. Controller 248 includes a timing/synchronization unit 250 coupled to laser 202, phase modulator 220 and to a corresponding timing/synchronization unit 289 in Alice's controller 288 (see FIG. 1 and the description for Alice below). Controller 248 coordinates the generation of optical pulses 204 and the modulation and detection of optical pulses P1 and P2 (FIG. 1) exchanged between Alice and Bob. An example timing/synchronization system is disclosed in pending PCT patent application serial no. PCT/US2004/03299, entitled "QKD systems with robust timing," which patent application is incorporated herein by reference and which is published as PCT Publication No. WO 2004/0732354 A2.

Figure 2B:
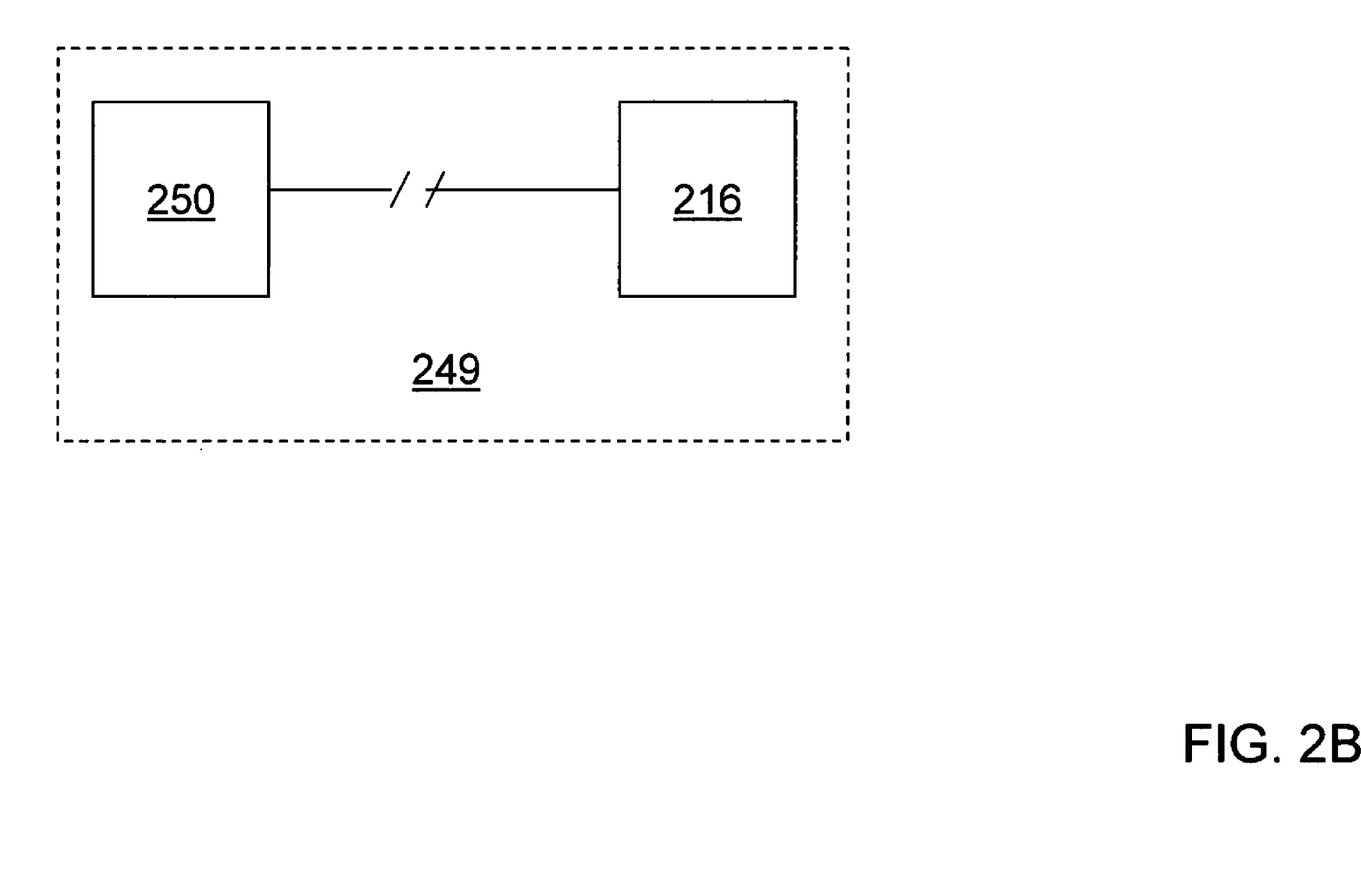
FIG. 2B is a close-up schematic diagram of the SPD control board of Bob of FIG. 2A.

With reference to FIG. 2B, timing/synchronization unit 250 and SPD unit 216 are included as part of a SPD control board 249, wherein the timing/synchronization unit generates a SPD gating signal S3 and delivers it to the SPD unit, as described in greater detail below.

Bob's Controller

With reference again to FIG. 2A, controller 248 further includes a processor 251 (e.g., a microprocessor) coupled to a memory device 252 (e.g., a ROM, PROM, EPROM, EEPROM, etc.) and optionally coupled to timing/synchronization unit 250 via line 257. Processor 251 is available to re-program memory device 252 and to perform other processing functions, as described below. Memory device 252 is adapted to store data in a register or look-up table. Memory device 252 is connected to a summation unit 253 also included in the controller. Memory device 252 is also connected to a temperature sensor TS (not shown in FIG. 1). In an example embodiment, temperature sensor TS is located at or near the SPD control electronics board 249 (see FIG. 2B) so as to measure the ambient temperature thereat or thereabout.

In an example embodiment, temperature sensor TS is a direct-to-digital sensor. In another example embodiment, temperature sensor TS provides an analog temperature signal (not shown) and is connected to an analog-to-digital converter ADC, which in turn is connected to memory device 252. ADC converts the analog temperature signal to a digital temperature signal ST for storage in the (digital) memory device 252.

The summation unit 253 is adapted to receive data in the form of a timing adjustment signal SS from timing/synchronization unit 250 and data in the form of a signal SM from memory device 252. Summation unit 253 is further adapted to combine the data (signals) SS and SM to form a compensated detector gating timing signal S3', as described below. Summation unit 253 is coupled to SPD unit 216.

In an example embodiment, processor 251, memory device 252 and temperature sensor TS are included in the controller as a single module, such as the DS1847 Dual Temperature-Controlled NV Variable Resistor (digital Potentiometer) module available from Maxim Integrated Products, Sunnyvale, Calif.

In an example embodiment, temperature sensor TS (and optionally analog-to-digital converter ADC used with an analog temperature sensor) is coupled to processor 251 via processor line (link) PL. Processor 251 is then available to process temperature signals ST directly prior to the temperature information being stored in memory device 252, as opposed to storing the unprocessed temperature information directly into the memory device.

In one example embodiment, processor 251 receives temperature information via signal ST from temperature sensor TS, and also receives timing information directly from timing/synchronization unit 250 via signal SS sent over line 257. The processor then calculates a functional relationship between the detector gating signal timing and the temperature, and provides calculated temperature vs. detector gating timing information to memory unit 252 via a signal SL, or directly to timing adjustment unit 253 via a processor signal SP sent over (dashed) line 258.

Alice

With reference again to FIG. 1, Alice includes a variable optical attenuator (VOA) 264 connected to optical fiber 240. A phase modulator (PM) 266 is arranged downstream of and is optically coupled to VOA 264. A Faraday mirror 270 is arranged downstream of and is optically coupled to PM 266.

Alice also includes a controller 288 operatively (e.g., electrically) coupled to PM 266 and VOA 264. Controller 288 also includes a timing/synchronization unit 289 coupled to PM 266 and to Bob's timing/synchronization unit 250 (FIG. 2A). Controllers 248 and 288 are linked (e.g., electrically or optically) via link 290 to synchronize the operation of Alice and Bob through the coordinated operation of the respective timing/synchronization units 289 and 250. In particular, the operation of the phase modulators 220 and 266, and SPD unit 216 are controlled and coordinated by controllers 248 and 288 relative to the timed launch of optical pulses 204 using gating signals S2, S1 and S3, respectively, when exchanging a quantum key between Alice and Bob. Thus, controllers 248 and 288 can in a sense be considered as constituting a single controller for the QKD system.

Idealized QKD System Operation

With reference to FIGS. 1 and 2A, in the idealized operation of system 200, an optical pulse 204 is generated by laser source 202 in response to a timing signal S0 from timing/synchronization unit 250. Optical pulse 204 is divided into two separate pulses P1 and P2 by time-multiplexing/demultiplexing optical system 206. In the present example embodiment, pulses P1 and P2 are relatively weak pulses The pulses are passed out of optical system input/output end 208B to PM 220, which is gated "off" to allow the pulses to pass therethrough unmodulated. Pulses P1 and P2 then pass to Alice over optical fiber 240. Pulses P1 and P2 continue to VOA 264, which can attenuate the pulses if necessary. The pulses then pass through PM 266 and are reflected by Faraday mirror 270, and then pass back through PM 266 a second time.

During one of the passes of pulses P1 and P2 through PM 266, the PM modulates one of the pulses—say, pulse P1—to form a phase-modulated pulse P1'. This is achieved by controller 288 sending a well-timed gating signal S1 that activates PM 266 for the short period of time (i.e., less than the time-separation between the pulses) when pulse P1 passes through PM 266. Pulses P1 and P2 then pass back through VOA 264, which can attenuate the pulses if necessary. The pulses then pass back to Bob and to PM 220 therein. PM 220 is then directed to randomly modulate one of the returning pulses—say unmodulated pulse P2—with one of the select phase modulation values. This is achieved by controller 248 providing a well-time gating signal S2 to PM 220 that activates the phase modulator during the short time period within which pulse P2 passes through PM 220.

Now-modulated pulses P1' and P2' (the latter is not shown in FIG. 1) continue on to optical system 206. Optical system 206 combines the pulses to form a combined pulse P3, which is directed out of detector output end 208C to SPD 216 unit and into fiber F1 or F2, depending on the overall phase of combined pulse P3. SPD unit 216 receives a detector gating signal S3 timed to coincide with the arrival of combined pulse P3. One of detectors 216A and 216B in SPD unit 216 receives pulse P3, depending on the overall phase imparted to pulses P1 and P2, and outputs a signal to controller 248 indicating the arrival of a photon in the corresponding SPD.

Once a desired number of optical pulses are exchanged, the key is derived using known techniques—for example, by Alice and Bob publicly comparing the basis of their measurements and only keeping the measurements (bits) corresponding to the same measurement basis. This forms the sifted key. They then choose a subset of the remaining bits to test for the presence of an eavesdropper Eve and then discard these bits. The act of eavesdropping on optical fiber 240 by Eve intercepting or otherwise attempting to measure the weak optical pulses being transmitted between Bob and Alice will necessarily introduce errors in the key due to the quantum nature of the photons being exchanged. If there are no errors in the sifted key due to the presence of an eavesdropper Eve, then the transmission is considered secure, and the quantum key is established.

Thermal Compensation Operation

The above description of QKD system 200 is for idealized operation. In practice, however, thermal effects within Bob can cause a change in the timing (e.g., jitter) of the operational detector gating signal S3. Accordingly, in an example embodiment, the effect of temperature on operational detector gating signal S3 is quantified. This is accomplished in an example embodiment by incrementally changing (e.g., ramping up) the temperature of Bob over a select temperature range RT (e.g., 0 to 50° C. in 0.2° C. increments) and recording (e.g., via temperature sensor TS) each temperature value in memory device 252. The temperature ramping may be achieved, for example, by placing Bob in an oven having sufficient temperature-control sensitivity.

Also, for each temperature value in the temperature range as recorded by temperature sensor TS, the QKD system is operated and the timing of the detector gating signal S3 is adjusted.

Figure 3A:
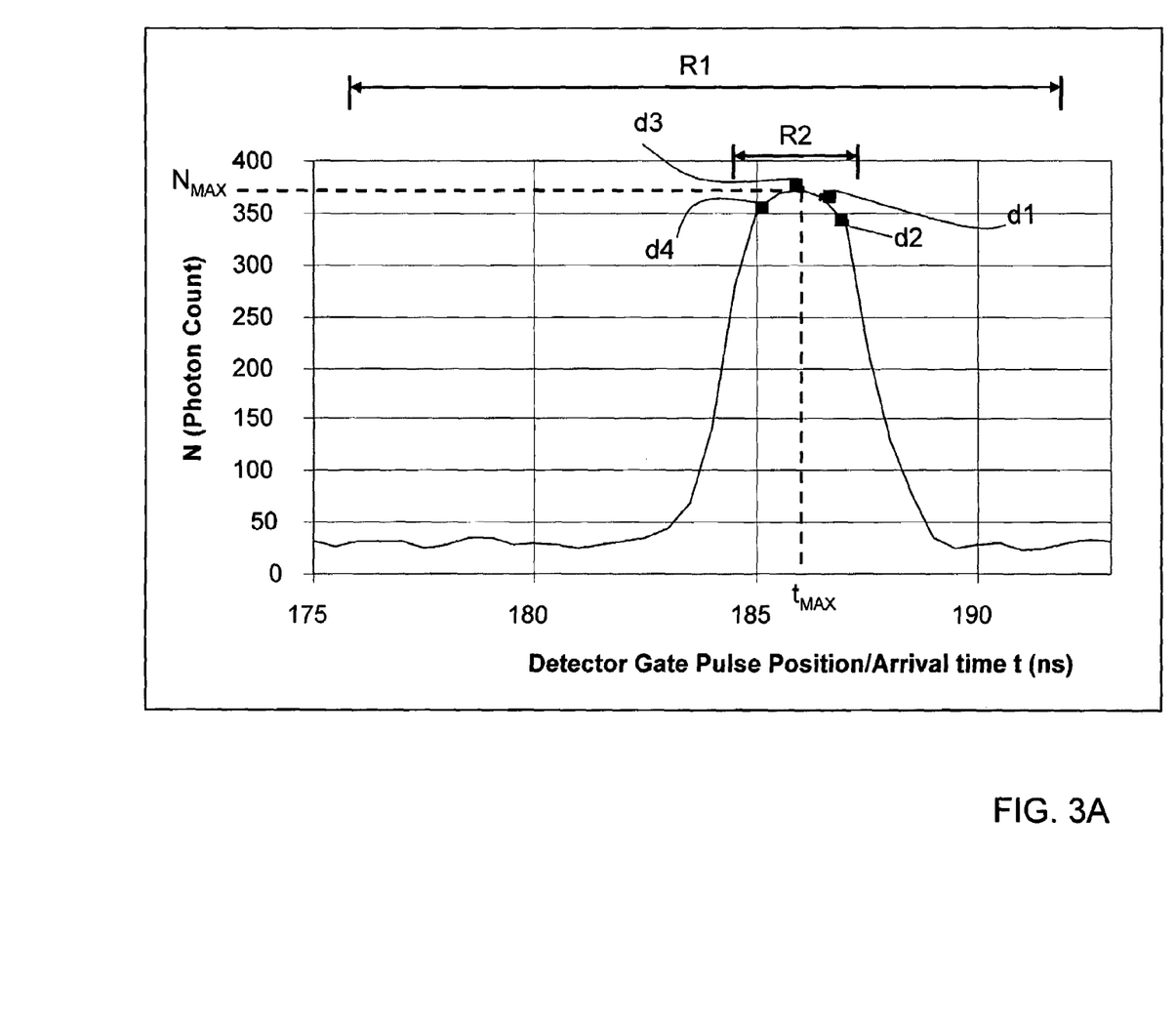
FIG. 3A is a plot of the SPD photon count versus the timing of the detector gating signal illustrating the optimum detector gating signal timing $t_{MAX}$ as indicated by the maximum photon count number $N_{MAX}$.

In one example embodiment, the adjustment is based on the timing of the detector gating signal S3 that provides an optimal number of photon counts in SPD unit 216. FIG. 3A is an example plot of the results of a detector gating signal scan, wherein the Y-axis is the number N of photon counts obtained during the detector gating interval (i.e., the gate pulse width W). The X-axis represents the relative timing (e.g., arrival time t) of the detector gating signal S3, which is varied for each temperature value to achieve the maximum number of photon counts $N_{MAX}$ associated with an optimum detector gating signal timing position $t_{MAX}$.

Data points d1-d4 are shown on the plot. In the context of the present invention, the maximum number of photon counts $N_{MAX}$ corresponds to optimal system performance because it corresponds to the highest data transmission rates and highest photon sensitivity level vs. timing, with no increase in dark current counts. The curve in FIG. 3A is obtained by incrementing the arrival time t of detector gating signal S3 over a first select range R1 of timing values t (X-axis) to find a first maximum photon count, and then over a second select range R2 (R2<R1) to find the local maximum photon count. In an example embodiment, the arrival time t corresponds to the position of the leading edge of the detector gating signal relative to a reference, e.g., a clock reference time provided by timing/synchronization unit 251.

In another example embodiment, the position of the detector gating signal S3 is measured using an oscilloscope and the timing difference from a reference timing position (value) is recorded. The timing difference is also recorded in memory device 252.

Also as discussed above, the temperature vs. detector gating signal timing is calculated by processor 251 based on detector gating signal timing information in signal SS from timing/synchronization unit 250 and temperature information from signal ST from temperature sensor TS and provided to memory device 252 via signal SL (or alternatively directly to summation unit 253 via processor signal SP).

In each case, the result is a temperature T vs. detector gating signal timing offset Δ ("T vs. Δ") look-up table for the select range of temperatures. The look-up table provides information relating to proper detector gating timing for a given temperature value.

Figure 3B:
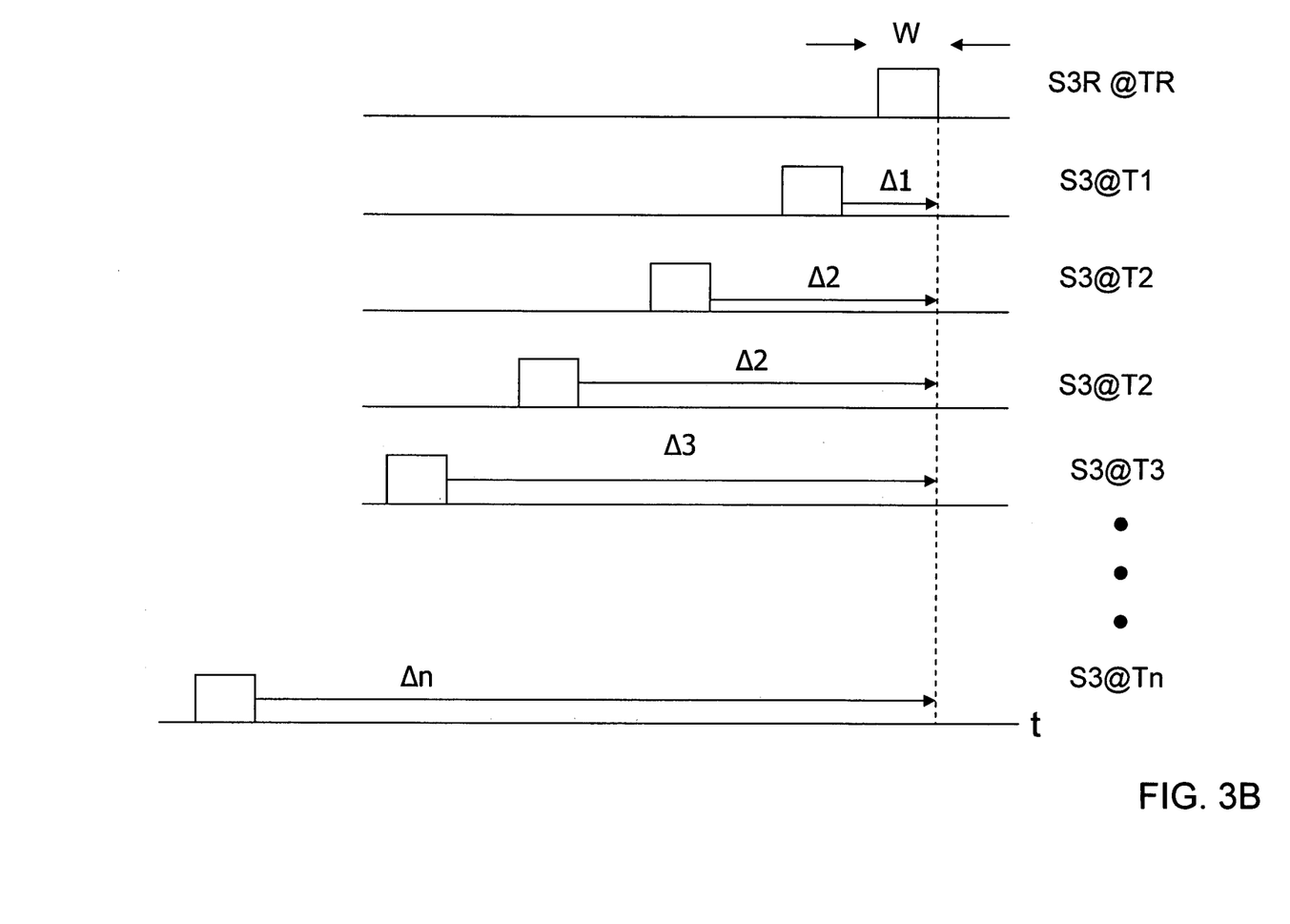
FIG. 3B is a timing diagram of detector gating signals as a function of temperature.

FIG. 3B is a timing diagram illustrating the variation Δ in detector gating signal timing with temperature T that forms the look-table set forth below in Table 1.

TABLE 1

| T vs. Δ | |
|---|---|
| T | Δ |
| TR | 0 |
| T1 | Δ2 |
| T2 | Δ3 |
| T3 | Δ4 |
| Tn | Δn |

In an example embodiment, a reference detector gating signal S3R corresponding to a reference temperature TR is established to provide a baseline reference for optimum gating signal timing.

Thus, in operating QKD system 200 to compensate for thermal variations in detector gating signal timing, temperature sensor TS provides ongoing temperature measurements via temperature signal ST to memory device 252. In an example embodiment, processor 251 periodically obtains a temperature measurement via temperature signal TS and calculates any change in temperature from previous temperature readings, e.g., as stored in memory device 252.

If a change in temperature has occurred beyond some threshold temperature increment (e.g., 0.2° C.), then memory device 252 sends a timing adjustment signal SM to summation unit 253. Timing adjustment signal SM carries timing information about detector gating signal S3 (e.g., the proper timing position or the required timing delay) from the T vs. S3 look-up table for the temperature measured at temperature sensor TS. If no change in temperature has occurred, or if the change is below the threshold temperature change, then no signal is sent, or alternatively adjustment signal SM indicates zero adjustment.

Further, timing/synchronization unit 250 sends a timing/synchronization signal SS to summation unit 253 that includes the uncompensated detector gating signal timing information (i.e., the uncompensated detector gating signal timing position). Summation unit 253 receives signals SM and SS and forms therefrom a time-compensated detector gating signal S3'. The compensated detector gating signal S3' includes a timing adjustment added to the operational detector gating signal S3 to properly compensate for the change in timing due to the thermal variation at Bob per the look-up table. In other words, in an example embodiment, the detector gating signal is compensated to restore the operating detector gating signal timing to that of the reference signal.

In an example embodiment, the timing of compensated detector gating signal S3' is that which yields an optimum number of photon counts at SPD unit 216. In an example embodiment, the compensated detector gating signal S3' is the reference detector gating timing signal SR in FIG. 3B.

In another example embodiment, the timing of the compensated detector gating signal is set by summation unit 253 in response to a function calculated in processor 251 based on data for the temperature T vs. detector gating signal timing adjustment Δ from the look-up table or provided directly to the processor during the data-taking phase.

One-Way QKD System Embodiment

Figure 4:
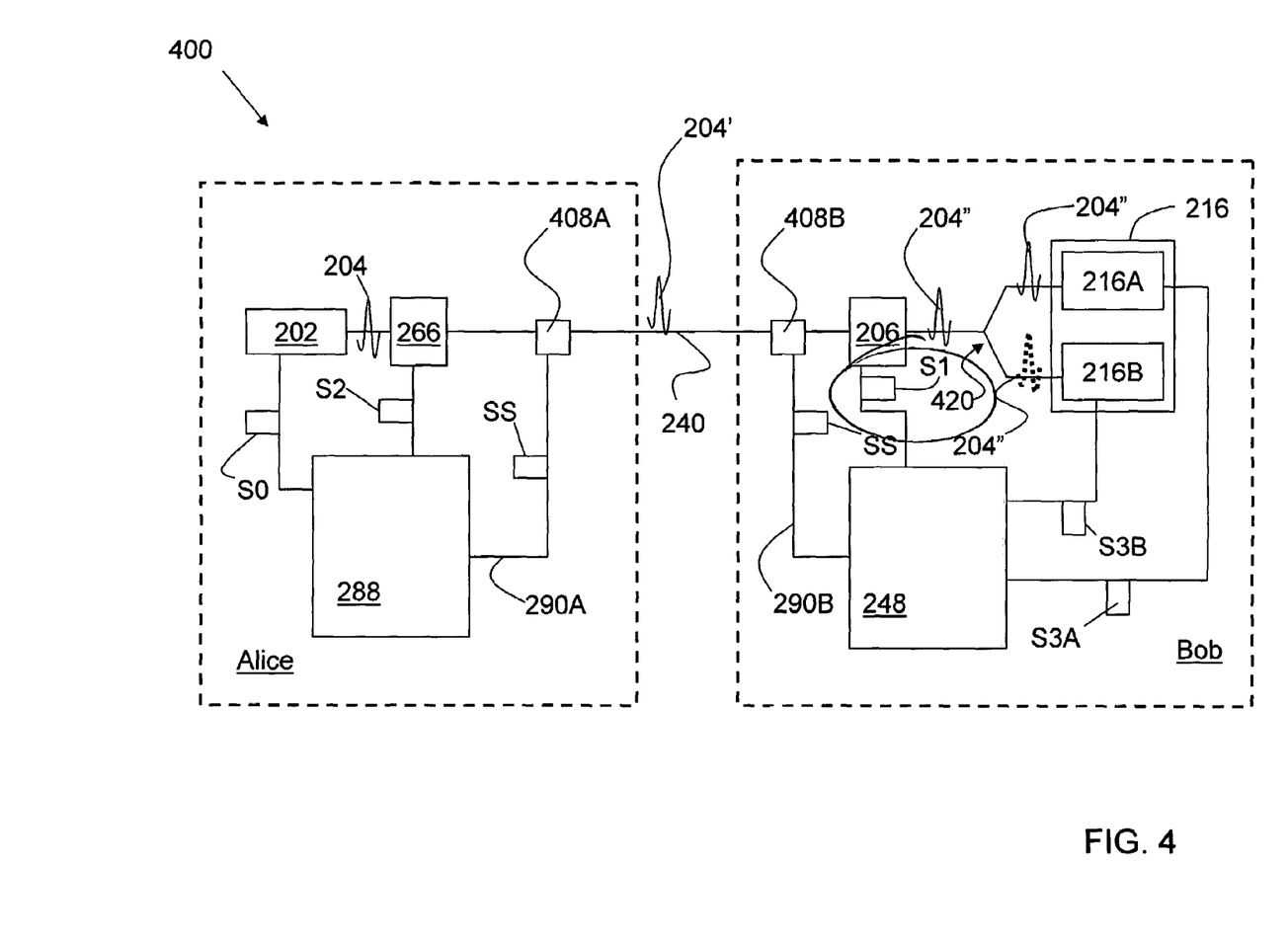
FIG. 4 is a schematic diagram of a one-way QKD system.

FIG. 4 is a simplified schematic diagram of an example one-way QKD system 400. The same elements from prior Figures are given the same reference numbers for the sake of illustration. System 400 includes at Alice laser 202, phase modulator 266 arranged in the optical path of the laser, and controller 288 operably coupled to laser 402 and modulator 266. Also included is an optical modem 408A optically downstream of phase modulator 266 that links (multiplexes) sync channel 290A with optical fiber (quantum channel) 240. Bob includes an optical modem 408B coupled to optical fiber 240 and Bob's sync channel 290B. Bob also include a modulator 206 downstream of optical modem 408B, and two detectors 216A and 216B arranged downstream of the phase modulator. The two detectors are coupled to phase modulator 206 via a 50—50 beamsplitting coupler 420.

Idealized QKD System Operation

In conventional operation, controller 288 provides control signal S0 to laser 202, which in response thereto emits an initial optical pulse 204. Pulse 204 travels through phase modulator 266, which randomly modulates pulse 206 according to a particular QKD protocol, via a timed gating signal S2 from controller 288. The modulated pulse 204' proceeds to optical modem 408A and is coupled into optical fiber 240. Also, sync signal SS generated by controller 288 travels over sync channel 290A to optical modem 408A and is coupled into optical fiber 240.

Figure 5:
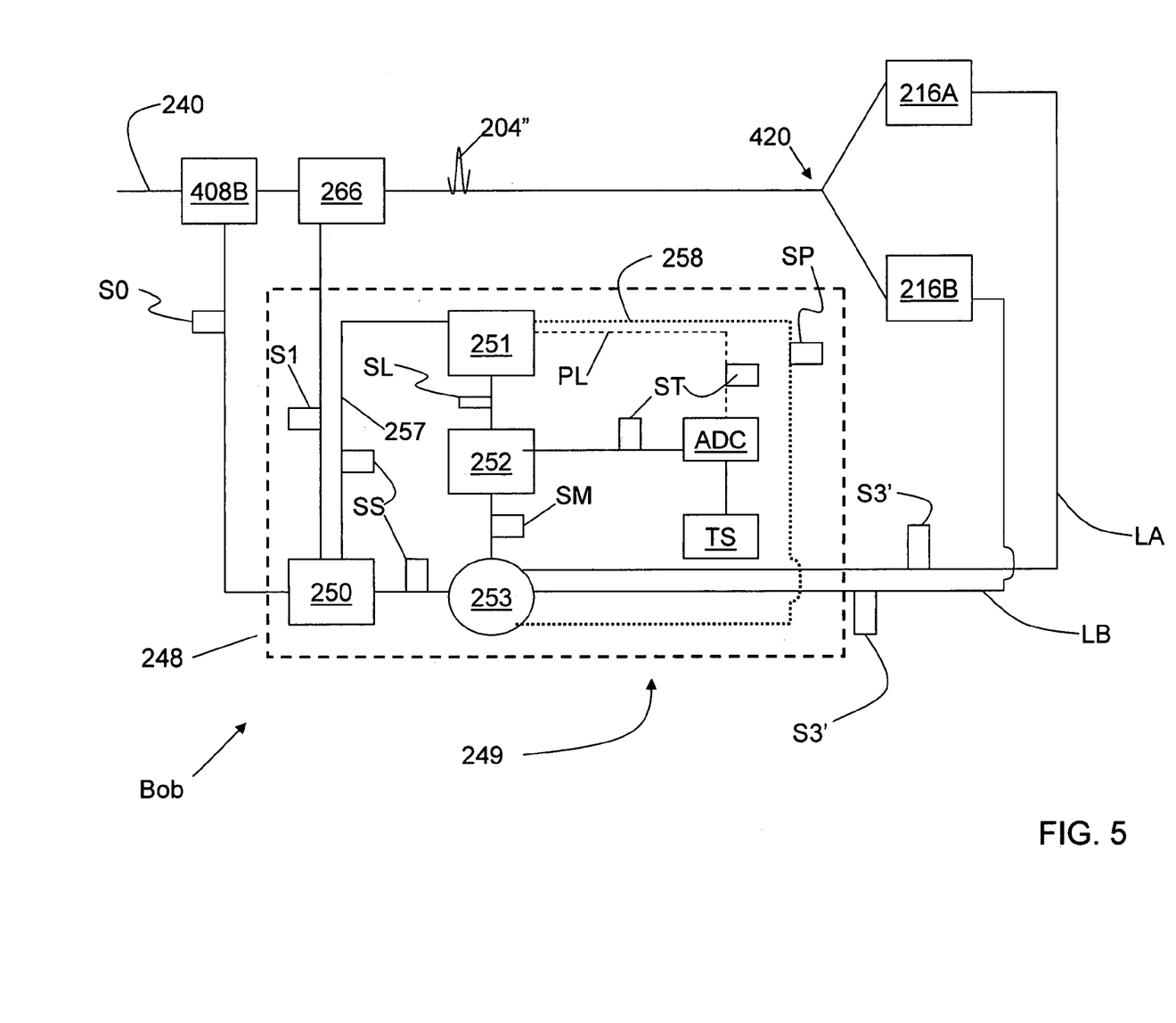
FIG. 5 is a close-up schematic diagram of the controller for the QKD system of FIG. 4, illustrating the elements that provide thermal compensation of the detector gating signal for the two SPDs in the SPD unit.

Optical pulse 204' and sync signal SS proceeds over to Bob, where they are received by optical modem 408B. Sync signal SS is directed to sync channel 290B and into controller 248, while optical pulse 204' proceeds to phase modulator 206. The latter modulates the phase of optical pulse 204' via a timed gating signal S1 from controller 248, thereby forming a twice-modulated optical pulse 204" (FIG. 5). The modulation is performed according to the QKD protocol being used for the system. Optical pulse 204" then proceeds to coupler 420, which directs the optical pulse to one of detectors 216A and 216B, depending on the overall modulation of the optical pulse. The pulses are detected by controller 248 sending timed gating signals S3A and S3B to SPDs 216A and 216B, respectively.

Thermal Compensation for One-Way System

FIG. 5 is a detailed schematic diagram of controller 248 of system 400. Controller 248 of system 400 includes the same elements as described above in connection with system 200 of FIG. 2A. Accordingly, the operation of controller 248 in providing thermal compensation for QKD system 400 is essentially the same as described above in connection with QKD system 200. In QKD system 400, temperature sensor TS is arranged at or near the two SPDs 216A and 216B control board. Further, lines LA and LB connecting SPDS 216A and 216B to summation unit 253 are made the same length so that compensated detector gating signals S3' arrive at the SPDs at the correct time. Alternatively, one of the compensated detector gating signals S3' is delayed to account for any path difference between lines LA and LB.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A method of providing temperature compensation of a QKD system having a first QKD station, comprising:
   determining a reference detector gating signal timing value corresponding to an ambient reference temperature in the first QKD station;
   incrementally varying and measuring a temperature of the QKD station over a range of temperature values;
   determining a change in timing from the reference detector gating signal timing value for each measured temperature value;
   storing the measured temperature value and the corresponding change in timing of the detector gating signal in a look-up table;
   operating the QKD station at an operating temperature that varies over time within the range of temperature values; and
   adjusting the timing of an operational detector gating signal by an amount associated with the operating temperature as defined in the look-up table.

2. The method of claim 1, wherein the temperature of the QKD station is measured at or near a single-photon detector (SPD) control board in the QKD station.

3. The method of claim 1, including providing the operational detector gating signal from a timing/synchronization unit that controls the timing of the QKD system.

4. The method of claim 3, including storing the measured temperature value and corresponding detector gating signal timing change in a memory device.

5. The method of claim 1, including:
   providing the operational detector gating signal timing from a timing/synchronization unit to a summation unit;
   providing to the summation unit a timing adjustment signal from a memory unit that includes the look-up table, said timing adjustment signal including information about an amount of timing adjustment required for the operating temperature; and
   forming in the summation unit a calibrated detector gating signal having a timing that corresponds to the optimum detection of photons in the SPD.

6. A method of providing temperature compensation of a QKD station of a QKD system having a single-photon detector (SPD), comprising:
   incrementally varying and measuring a temperature of the QKD station over a range of temperature values;
   determining an optimum detector gating signal timing value for each measured temperature value;
   storing the measured temperature value and the corresponding optimal detector gating signal timing value in a look-up table;
   operating the QKD station at an operating temperature that varies over time within the range of temperature values; and
   adjusting the timing of the detector gating signal to correspond to that associated with the corresponding operating temperature based on the temperature and timing values stored in the look-up table.

7. The method of claim 6, wherein the optimum detector gating signal timing is determined by operating the QKD system and varying the detector gating signal timing to determine a maximum number of photon counts at the SPD unit.

8. The method of claim 6, including:
   providing an uncompensated detector gating signal from a timing/synchronization unit that controls the timing and synchronization of the QKD system to a summation unit;
   providing the look-up table timing value to the summation unit in response to a temperature signal representative of the operating temperature;
   forming in the summation unit a compensated detector gating signal; and
   providing the compensated detector gating signal to the SPD.

9. The method of claim 8, including measuring the temperature of the QKD station at or near a SPD control board that includes the timing/synchronization unit and the SPD.

* * * * *

UNITED STATES PATENT AND TRADEMARK OFFICE
CERTIFICATE OF CORRECTION

PATENT NO. : 7,102,121 B2  Page 1 of 2
APPLICATION NO. : 10/882013
DATED : September 5, 2006
INVENTOR(S) : Michael Lagasse

It is certified that error appears in the above-identified patent and that said Letters Patent is hereby corrected as shown below:

FIG. 4 should appear as follows:

Signed and Sealed this

Thirtieth Day of January, 2007

JON W. DUDAS
*Director of the United States Patent and Trademark Office*

FIG. 4